US011872837B2

(12) United States Patent
Schumacher et al.

(10) Patent No.: US 11,872,837 B2
(45) Date of Patent: Jan. 16, 2024

(54) ABRASION-RESISTANT WOOD BOARD

(71) Applicant: Flooring Technologies Ltd., Kalkara (MT)

(72) Inventors: Christoph Schumacher, Pritzwalk (DE); Stefan Zick, Wittstock/Dosse (DE)

(73) Assignee: Flooring Technologies Ltd., Kalkara (MT)

( * ) Notice: Subject to any disclaimer, the term of this patent is extended or adjusted under 35 U.S.C. 154(b) by 0 days.

(21) Appl. No.: 17/816,754

(22) Filed: Aug. 2, 2022

(65) Prior Publication Data

US 2022/0363089 A1 Nov. 17, 2022

Related U.S. Application Data

(63) Continuation of application No. 17/424,696, filed as application No. PCT/EP2020/050300 on Jan. 8, 2020.

(30) Foreign Application Priority Data

Jan. 22, 2019 (EP) .................................... 19153016

(51) Int. Cl.
*B44C 5/04* (2006.01)
*B05D 7/00* (2006.01)

(52) U.S. Cl.
CPC ............ *B44C 5/0476* (2013.01); *B05D 7/584* (2013.01); *B44C 5/0407* (2013.01); *B44C 5/0492* (2013.01)

(58) Field of Classification Search
CPC .................................................... B44C 5/0476
See application file for complete search history.

(56) References Cited

U.S. PATENT DOCUMENTS

| | | | |
|---|---|---|---|
| 3,705,830 | A | 12/1972 | Gurgui et al. |
| 4,940,503 | A | 7/1990 | Lindgren et al. |
| 6,465,046 | B1 | 10/2002 | Hansson et al. |
| 6,555,216 | B2 | 4/2003 | Chen et al. |
| 8,173,240 | B2 | 5/2012 | Dohring |
| 8,512,804 | B2 | 8/2013 | Oldorff |
| 8,632,875 | B2 | 1/2014 | Oldorff |
| 8,955,281 | B2 | 2/2015 | Pietruczynik et al. |
| 8,969,219 | B2 | 3/2015 | Gvishi |
| 8,993,049 | B2 | 3/2015 | Pervan |
| 9,321,299 | B2 | 4/2016 | Hansson et al. |
| 9,365,028 | B2 | 6/2016 | Vogel et al. |
| 9,434,206 | B2 | 9/2016 | Hoff |
| 9,757,974 | B2 | 9/2017 | Kalwa |
| 9,994,010 | B2 | 6/2018 | Pervan |
| 10,094,123 | B2 | 10/2018 | Meersseman et al. |

(Continued)

FOREIGN PATENT DOCUMENTS

| | | | |
|---|---|---|---|
| CA | 2283835 | A1 | 8/1999 |
| CH | 648979 | A3 | 4/1985 |

(Continued)

OTHER PUBLICATIONS

Machine Translation of WO2017198474 A1 (Year: 2017).

(Continued)

*Primary Examiner* — Ian A Rummel
(74) *Attorney, Agent, or Firm* — The Webb Law Firm

(57) ABSTRACT

An abrasion-resistant wood-based panel having a top side and a bottom side, with at least one decorative layer arranged on the top side, in particular with a structure synchronous with the decoration, is disclosed herein.

17 Claims, 1 Drawing Sheet

(56) References Cited

U.S. PATENT DOCUMENTS

| | | | |
|---|---|---|---|
| 10,406,558 B2 | 9/2019 | Dohring et al. |
| 11,192,398 B2 | 12/2021 | Kalwa et al. |
| 2001/0049022 A1 | 12/2001 | Takeuchi et al. |
| 2004/0086678 A1 | 5/2004 | Chen et al. |
| 2006/0240247 A1 | 10/2006 | Haller |
| 2008/0000182 A1 | 1/2008 | Pervan et al. |
| 2010/0080896 A1 | 4/2010 | Bachmann |
| 2010/0098963 A1 | 4/2010 | Dohring et al. |
| 2010/0221493 A1 | 9/2010 | Hintze |
| 2011/0117340 A1 | 5/2011 | Oldorff |
| 2011/0217463 A1 | 9/2011 | Oldorff |
| 2012/0015176 A1 | 1/2012 | Riebel et al. |
| 2014/0017452 A1 | 1/2014 | Pervan et al. |
| 2014/0044958 A1 | 2/2014 | Steinmann et al. |
| 2014/0255670 A1 | 9/2014 | Kalwa |
| 2014/0290171 A1 | 10/2014 | Vermeulen |
| 2015/0030817 A1 | 1/2015 | Wiegelmann et al. |
| 2015/0064421 A1 | 3/2015 | Dohring |
| 2015/0097907 A1 | 4/2015 | Kalwa et al. |
| 2015/0197942 A1 | 7/2015 | Pervan et al. |
| 2016/0016390 A1 | 1/2016 | Lundblad et al. |
| 2017/0217121 A1 | 8/2017 | Maier et al. |
| 2017/0314273 A1 | 11/2017 | Hugi et al. |
| 2017/0370111 A1 | 12/2017 | Troendle et al. |
| 2018/0002939 A1 | 1/2018 | Harve et al. |
| 2018/0080867 A1 | 3/2018 | Denk et al. |
| 2018/0339504 A1 | 11/2018 | Ziegler et al. |
| 2019/0160859 A1 | 5/2019 | Kalwa et al. |
| 2020/0376886 A1 | 12/2020 | Denk et al. |
| 2022/0212229 A1 | 7/2022 | Kalwa et al. |

FOREIGN PATENT DOCUMENTS

| | | | |
|---|---|---|---|
| CN | 1084786 | A | 4/1994 |
| CN | 101374655 | A | 2/2009 |
| CN | 101608417 | A | 12/2009 |
| CN | 101712166 | A | 5/2010 |
| CN | 102086616 | A | 6/2011 |
| CN | 102171057 | A | 8/2011 |
| CN | 102264802 | A | 11/2011 |
| CN | 102294722 | A | 12/2011 |
| CN | 102083636 | B | 6/2013 |
| CN | 103526910 | A | 1/2014 |
| CN | 103764404 | A | 4/2014 |
| CN | 104220272 | A | 12/2014 |
| CN | 104314272 | A | 1/2015 |
| CN | 104520080 | A | 4/2015 |
| CN | 104640643 | A | 5/2015 |
| CN | 104870203 | A | 8/2015 |
| CN | 204551953 | U | 8/2015 |
| CN | 105307869 | A | 2/2016 |
| CN | 207449270 | U | 6/2018 |
| CN | 108864590 | A | 11/2018 |
| CN | 109153283 | A | 1/2019 |
| CN | 113874128 | A | 12/2021 |
| DE | 102004031547 | A1 | 3/2005 |
| DE | 102004032058 | A1 | 5/2005 |
| DE | 102008046749 | A1 | 3/2010 |
| DE | 102010036454 | A1 | 1/2012 |
| DE | 10117807 | B4 | 7/2012 |
| DE | 202011110956 | U1 | 11/2017 |
| EP | 20153400 | B1 | 11/1993 |
| EP | 1084317 | B1 | 4/2003 |
| EP | 1820640 | B1 | 5/2010 |
| EP | 2314381 | A1 | 4/2011 |
| EP | 2189282 | B1 | 5/2011 |
| EP | 2463116 | B1 | 11/2013 |
| EP | 2700508 | A1 | 2/2014 |
| EP | 2774770 | B1 | 4/2015 |
| EP | 2977219 | A1 | 1/2016 |
| EP | 3246175 | A1 | 11/2017 |
| EP | 3338993 | A1 | 6/2018 |
| EP | 3351402 | B1 | 4/2019 |
| EP | 3480030 | A1 | 5/2019 |
| JP | H11156818 | A | 6/1999 |
| JP | 2015003400 | A | 1/2015 |
| JP | 2017503688 | A | 2/2017 |
| JP | 2017113696 | A | 6/2017 |
| NL | 6900898 | | 7/1969 |
| RU | 2015886 | C1 | 7/1994 |
| RU | 2419495 | C2 | 5/2011 |
| WO | 9317182 | A1 | 9/1993 |
| WO | 0148333 | A1 | 7/2001 |
| WO | 2006002917 | A2 | 1/2006 |
| WO | 2007042258 | A1 | 4/2007 |
| WO | 2010112125 | A1 | 10/2010 |
| WO | 2011045690 | A2 | 4/2011 |
| WO | 2011076305 | A1 | 6/2011 |
| WO | 2014029887 | A1 | 2/2014 |
| WO | 2015152802 | A1 | 10/2015 |
| WO | 2016082066 | A1 | 6/2016 |
| WO | 2016114710 | A1 | 7/2016 |
| WO | 2017198474 | A1 | 11/2017 |
| WO | 2018067641 | A1 | 4/2018 |
| WO | 2018198034 | A1 | 11/2018 |
| WO | 2018217158 | A1 | 11/2018 |

OTHER PUBLICATIONS

Baugh et al. “Diving Deep Into the Invasion of LVT and The Impact on the Flooring Industry”, Building Products Industry Update, Sep. 4, 2018, pp. 1-31.

“Grundierung”, Wikipedia, Oct. 27, 2018, pp. 1-2 (English-Language Translation).

Merline et al. “Melamine formaldehyde: curing studies and reaction mechanism”, Polymer Journal, 2013, pp. 413-419, vol. 45.

“Particle Board vs Oriented Strand Board: How Are They Different? ”, 2015, pp. 1-3. Retrieved from https://web.archive.org/web/20150826012716/https://builddirect.com/learning-center/building-materials/particleboard-oriented-strand/.

Thompson et al. “Fatigue in wood-based panels. Part 1: The strength variability and fatigue performance of OSB, chipboard and MDF”, Wood Science and Technology, 2002, pp. 255-269, vol. 36.

Xu et al. “The effect of fillers on the wear resistance of thermoplastic polymeric coatings”, Wear, 2001, pp. 1522-1531, vol. 251.

Zhai, L. “Portable Manual for applying decorative materials”, Beijing Hope Electronic Press, Aug. 2018, pp. 160-161 (English-Language Translation).

Zhu et al. “Furniture Surface Coating”, Northeast Forestry University Press, Aug. 2016, pp. 83-84 (English-Language Translation).

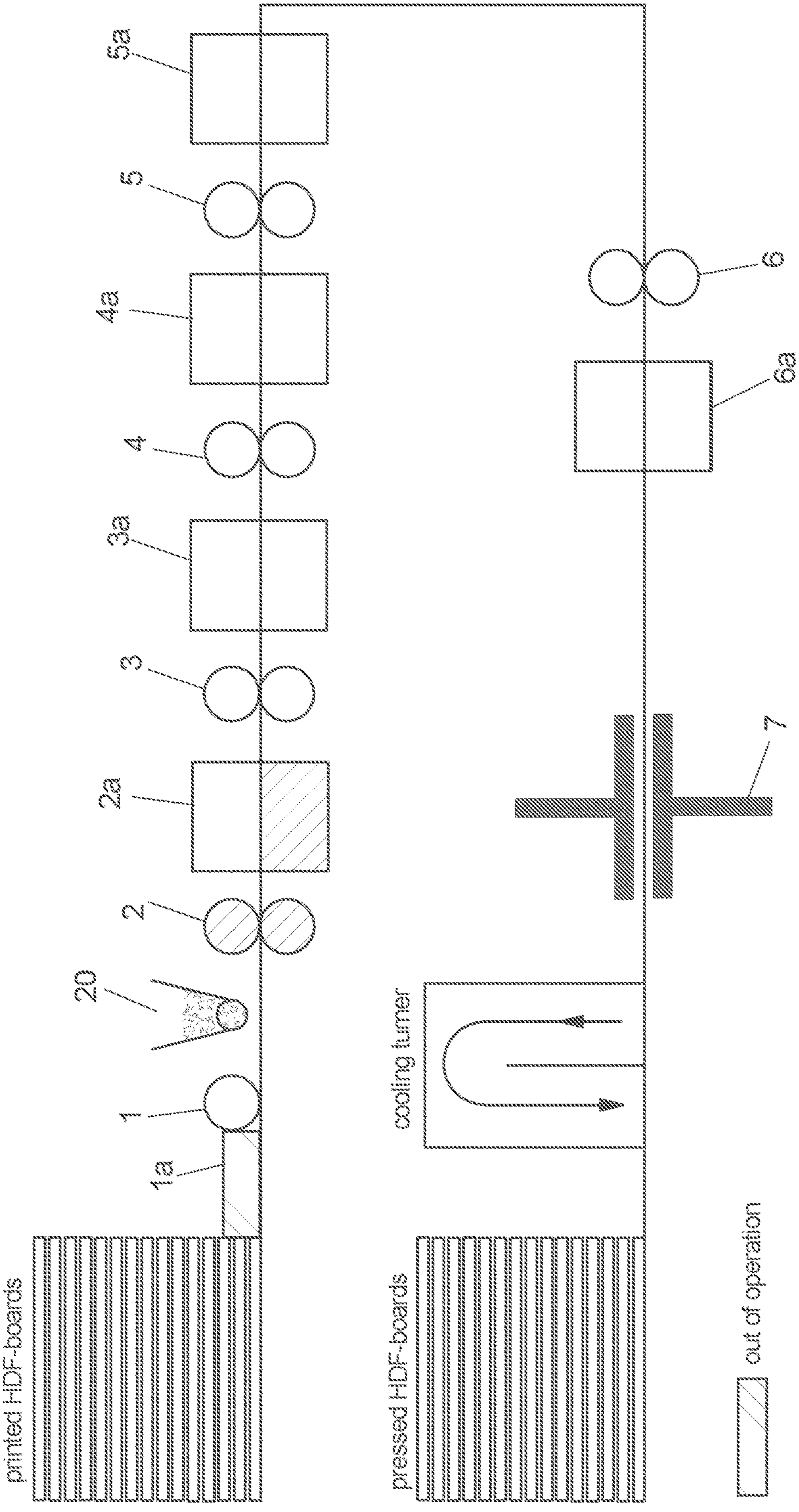
printed HDF-boards
1a
1
20
2
2a
3
3a
4
4a
5
5a
cooling turner
7
6a
6
pressed HDF-boards
out of operation

ABRASION-RESISTANT WOOD BOARD

CROSS-REFERENCE TO RELATED APPLICATIONS

This application is a continuation of U.S. application Ser. No. 17/424,696 filed Jul. 21, 2021, which is the United States national phase of International Application No. PCT/EP2020/050300 filed Jan. 8, 2020, and claims priority to European Patent Application No. 19153016.1 filed Jan. 22, 2019, the disclosures of which are hereby incorporated by reference in their entirety.

BACKGROUND OF THE INVENTION

Field of the Invention

The disclosure relates to an abrasion-resistant wood-based panel provided with a decorative layer, in particular a wood-based panel provided with a structure synchronous with the decor.

Description of Related Art

A large number of products or product surfaces that are subject to wear due to mechanical stress must be protected against premature damage or destruction due to wear by applying wear-resistant coatings. These products can be, for example, furniture, interior panels, flooring, etc. Depending on the frequency and intensity of use, different protective measures must be applied so that the user can be guaranteed the longest possible service life.

A large number of the above-mentioned products have decorative surfaces which, when worn due to intensive use, quickly appear unsightly and/or can no longer be cleaned. These decorative surfaces very often consist of papers impregnated with thermosetting resins, which are pressed onto the wood-based substrates used in so-called short-cycle presses. Melamine-formaldehyde resin is very often used as the thermosetting resin.

One approach to improving the wear resistance of decorative surfaces is to apply or introduce abrasion-resistant particles into the resin layers near the surface. This can be done, for example, by applying a liquid resin containing abrasion-resistant particles to the corresponding surfaces, whereby in the case of decorative wood-based panels, corundum particles are usually used as abrasion-resistant particles.

To avoid sedimentation of the corundum particles in the liquid resin, into which the corundum is often introduced for application, and the problems associated with this, the abrasion-resistant particles can also be scattered using a suitable device.

Another problem caused by corundum-containing formulations in the further process step of pressing is the sheet wear of the structured press plate in the short-cycle press, which is higher the more corundum is applied in g per square meter, the larger the grain size and the worse this corundum is covered by corundum-free resin layers.

In the past, to reduce sheet metal wear, the corundum-containing layer was blocked off against the press plate with subsequent resin layers. For this purpose, glass beads can be introduced into the liquid layer structure together with the resin layers, with the glass beads acting as spacers between the abrasion-resistant particles and the press plate. In this way, sheet wear could be reduced at least somewhat. Approaches of this kind are described, among others, in EP 3 480 030 A1 and EP 3246175 A1, which were published subsequently.

However, in order to produce wood-based panels with high abrasion values, in particular abrasion classes AC4 to AC6, and at the same time low press plate wear, it is necessary to increase the amount of abrasion-resistant particles. As already indicated, however, this also means higher wear of the press plates, which can only be insufficiently reduced with the previous approaches.

SUMMARY OF THE INVENTION

The proposed solution is therefore based on the technical object of ensuring not only the reliable achievement of high abrasion values, in particular of abrasion classes AC4 to AC6, but also low wear of the press plate. This should be achieved above all for a process in which printed panels are processed in a wide variety of formats. If possible, a process simplification and at least cost neutrality should be achieved. The disadvantages already discussed should, if possible, no longer occur as a result of a new process. This should also enable effective quality control, which provides timely information about the current process.

This object is solved by a method having features as described herein.

Accordingly, there is provided a method for producing an abrasion-resistant wood-based panel having an upper side and a bottom side, with at least one decorative layer arranged on the upper side, in particular with a structure synchronous with the decorative layer, the method comprising the following steps:

- Applying at least one first resin layer to the at least one decorative layer on the upper side of the wood-based panel, the first resin layer having a solids content of between 60 and 80 wt %, preferably 65 and 70 wt %, more preferably between 65 and 67 wt %;
- even scattering of abrasion-resistant particles onto the first resin layer on the upper side of the wood-based panel;
- wherein the first resin layer provided with the abrasion-resistant particles on the upper side of the wood-based panel is not dried after application,
- applying at least one second resin layer to the first, moist resin layer provided with the abrasion-resistant particles on the upper side of the wood-based panel, the second resin layer having a solids content of between 60 and 80% by weight, preferably between 65 and 70% by weight, more preferably between 65 and 67% by weight;
- subsequent drying of the assembly of first resin layer and second resin layer in at least one drying apparatus;
- applying at least a third resin layer, wherein the third resin layer has a solids content between 60 and 80 wt %, preferably 65 and 70 wt %, more preferably between 65 and 67 wt %, and contains glass beads;
- subsequent drying of the applied third resin layer in at least one further drying device;
- applying at least a fourth resin layer, wherein the fourth resin layer has a solids content between 50 and 70 wt %, preferably 55 and 65 wt %, more preferably between 58 and 62 wt %, and contains glass beads;
- subsequent drying of the applied fourth resin layer in at least one further drying apparatus;
- applying at least a fifth resin layer, wherein the fifth resin layer has a solids content between 50 and 70 wt %, preferably 55 and 65 wt %, more preferably between 58 and 62 wt %, and contains glass beads;

subsequent drying of the applied fifth resin layer in at least one further drying device;

applying at least a sixth resin layer, wherein the sixth layer has a solids content between 50 and 70 wt %, preferably 55 and 65 wt %, more preferably between 58 and 62 wt %, and does not contain glass beads;

subsequent drying of the applied sixth resin layer in at least one further drying apparatus; and pressing of the layer structure in a short-cycle press.

Accordingly, the present method enables the provision of wood-based panels provided with a decorative layer, wherein the decorative layer is provided with a structure synchronous with the decorative layer, in various formats with high wear resistance in a cost-effective manner. According to the present method, a first resin layer, in particular in the form of a first thermosetting resin layer with a high solids content, such as a melamine-formaldehyde resin layer, is applied to the decorative layer (pretreated or non-pretreated) of the wood-based panel. Initially, there is no drying or pre-drying of the first resin layer, but rather the abrasion-resistant particles are scattered evenly onto the wet or still liquid first resin layer on the top surface of the wood-based panel using a suitable scattering device. Since the first resin layer is still liquid at the time of scattering, the abrasion-resistant particles can sink into the resin layer. Due to the high solids content of the resin and a resulting increased viscosity, the abrasion-resistant particles are also well embedded in the resin layer.

Subsequently (i.e. without intermediate drying of the first resin layer with the abrasion-resistant particles scattered on it), a second resin layer with increased solids content is applied to the still moist first resin layer. This is done by installing an applicator unit downstream of the scattering device in the processing direction (i.e. between the first dryer and the scattering device). The additionally installed applicator picks up the abrasion-resistant particles that are not attached to the first resin layer or have not penetrated the first resin layer with its roller application and transports them back to the resin applicator. There, an equalizing concentration is established and the abraded abrasion-resistant particles are evenly applied to the next surfaces via the roller. This results in an enrichment of the abrasion-resistant particles in the second coating unit up to a maximum abrasion-resistant particle content of 10%. This prevents loose particles from being blown away or picked up in the dryer.

This is followed by a third resin layer with increased solids content and glass beads, followed by a fourth and fifth resin layer with normal solids content (approx. 55-60 wt %) and glass beads, and a sixth resin layer with normal solids content without glass beads.

Due to the present layer structure of resin layers with increased solids content and conventional, normal solids content, cellulose fibers and glass beads, the abrasion-resistant particles are covered and no longer protrude from the coated surface. In this way, the detrimental effect, e.g. on a subsequent pressed sheet, of corundum particles protruding from the coated surface can be reduced or even largely eliminated.

With the present method, the service life of the press plates can be increased in the downstream pressing process for laminate formation. Overall, process costs are reduced due to reduced material and maintenance costs. Also, no new equipment/devices have to be installed in the production line.

Also, the present layer structure enables the embossing of structures synchronous to the decor using deeper structured press plates. This is made possible by the thickness of the overall layer, which can only be achieved by the specific resin structure with layers of resins with different solids contents. Thus, improvements between 25 and 50% can be observed with the present process on the basis of the co-written sheet lifetimes.

In an embodiment of the present process, the wood-based panel provided with the decorative layer is not heated in a dryer, such as an IR dryer, prior to application of the first resin layer. This can be done by switching off an IR dryer provided in the production line, or no IR dryer is provided in the production line. By avoiding heating of the wood-based panel provided with a decorative layer, there is no electrostatic charging of the panel surface and the scattering curtain when scattering the corundum becomes homogeneous. Also, the thermal lift resulting from the emitted heat of the panel surface of the board is reduced.

The omission of heating the printed wood-based panel in an IR dryer is not apparent to a person skilled in the art, since typically a protective layer of a resin that has not yet fully cured is arranged on the decorative layers applied by means of direct printing. The protective layer may be a formaldehyde-containing resin, in particular a melamine-formaldehyde resin, urea-formaldehyde resin or melamine-urea-formaldehyde resin, and may contain glass spheres (size 50-150μ) as spacers for the intermediate storage of the boards. This protective layer serves as a temporary protection of the decorative layer for storage before further finishing. The protective layer on the decorative layer is not yet fully cured, but has a certain residual moisture content of about 10%, preferably about 6%, and can still be further crosslinked. Such protective layers are described, for example, in WO 2010/112125 A1 or EP 2 774 770 Bl.

The typical step of heating decorative layers provided with such a (thermoset) protective layer serves to dry the protective layer and to adjust the residual moisture level and thus the tackiness of the protective layer and the adhesion of subsequent resin layers.

However, it has been shown that the step of heating the protective layer has a negative effect on the scattering pattern of the abrasion-resistant particles. Omitting the heating of the printed wood-based panel provided with a protective layer causes a homogenization of the scattering pattern and thus a uniform distribution of the abrasion-resistant particles on the panel surface.

The resin layers used in the present process are preferably based on aqueous formaldehyde-containing resins, in particular melamine-formaldehyde resin, urea-formaldehyde resin or melamine-urea-formaldehyde resin.

The resins used preferably each contain additives, such as hardeners, wetting agents (surfactants or mixtures thereof), defoamers, release agents and/or other components. The wetting agent is used in the resin layers in each case in an amount of 0.1-1% by weight. Release agents and smoothing agents are preferably added to the fifth and sixth resin layers in amounts between 0.5-1.5 wt %.

The preferred hardener is a latent hardener, such as alkanolamine salts of acids, e.g. an alkanolamine salt of a sulfonic acid (see DeuroCure from the manufacturer Deurowood). The latent hardener is preferably added to the resin immediately before the application unit in order to avoid premature curing of the resin and thus losses. Accordingly, the hardener is preferably not added centrally, but the variable hardener quantity is added at the corresponding application units. This has the advantage that, in the event of a plant malfunction, the resin can remain in the lines longer without the hardener. Only the application units with resin hardener have to be specifically adjusted to the pot life of the system. This significantly reduces losses due to the need to pump out resin-hardener in the event of a shutdown or malfunction.

The proportion of hardener in the individual resin layers varies and can be between 0.5 to 1.5 wt %, preferably 0.7 to 1.3 wt %. It is particularly preferred that the proportion of hardener per resin layer decreases in the direction of production; i.e. in the lower resin layers the proportion of hardener is greater than in the upper resin layers. By reducing the amount of hardener from the lower to the upper resin layers, uniform curing of the individual resin layers in the KT press can be achieved.

In one variant of the method, the first resin layer is applied in an amount between 10-100 g/m$^2$, preferably 40-80 g/m$^2$, more preferably 45-60 g/m$^2$. The first resin layer is applied, for example, with a grooved applicator roll in a first applicator unit.

The first resin layer can contain cellulose fibers or wood fibers, preferably cellulose fibers. By adding cellulose fibers, the viscosity of the resin to be applied can be adjusted and the application of the first top layer to the wood-based panel can be increased. The amount of cellulose fibers applied with the first resin layer can be between 0.1 and 1 wt %, preferably between 0.5 and 0.8 wt % (based on the amount of resin to be applied) or between 0.1-0.5 g/m$^2$, preferably 0.2-0.4 g/m$^2$, more preferably 0.25 g/m$^2$. The cellulose fibers preferably used have a white color and are in the form of a fine or granular, slightly hygroscopic powder.

In a further embodiment of the present method, abrasion resistant particles, particles of corundum (aluminum oxides), boron carbides, silicon dioxides, silicon carbides are used. Particles of corundum are particularly preferred. Preferably, these are high-grade (white) corundum with a high transparency, so that the optical effect of the underlying decor is adversely affected as little as possible. Corundum has an irregular spatial shape.

The amount of scattered abrasion-resistant particles is 10 to 50 g/m$^2$, preferably 10 to 30 g/m$^2$, in particular preferably 15 to 25 g/m$^2$. The amount of scattered abrasion-resistant particles depends on the abrasion class to be achieved and the particle size. Thus, in the case of abrasion class AC3, the amount of abrasion-resistant particles is in the range between 10 to 15 g/m$^2$, in abrasion class AC4 between 15 to 20 g/m$^2$, and in abrasion class AC5 between 20 to 25 g/m$^2$ when using grit size F200. In the present case, the finished boards preferably have abrasion class AC4.

Abrasion-resistant particles with grain sizes in classes F180 to F240, preferably F200, are used. The grain size of class F180 covers a range of 53-90 μm, F220 from 45-75 μm, F230 34-82 μm, F240 28-70 μm (FEPA standard). In one embodiment, precious corundum white F180 to F240, preferably in a main grain size range of 53-90 μm, are used as abrasion-resistant particles. In a particularly preferred embodiment, corundum particles of class F200 are used, where F200 is a mixture between F180 and F220 and has a diameter between 53 and 75 μm.

The abrasion-resistant particles must not be too fine-grained (risk of dust formation), but also not too coarse-grained. The size of the abrasion-resistant particles is thus a compromise.

In a more advanced embodiment, silanized corundum particles may be used. Typical silanizing agents are aminosilanes.

In another embodiment of the present method, the second resin layer to be applied to the upper surface of the wood-based panel is applied in an amount between 10-50 g/m$^2$, preferably 20-30 g/m$^2$, more preferably 20-25 g/m$^2$. Overall, the amount of the second resin layer is less than the amount of the first resin layer. In a preferred embodiment, the second resin layer to be applied to the top surface of the wood-based panel does not contain glass beads.

The total amount of first and second resin layer is between 50-100 g/m$^2$, preferably 60-80 g/m$^2$, more preferably 70 g/m$^2$. Thus, in one embodiment, the amount of first resin layer is 50 g/m$^2$ and the amount of second resin layer is 25 g/m$^2$.

As already mentioned above, the abrasion-resistant particles in the second resin layer are enriched by entrainment of loose particles by the second applicator. Thus, a content of abrasion-resistant particles of 5 to 15 wt %, preferably 10 wt %, can occur in the resin to be applied as the second resin layer.

As explained above, further resin layers, a third, fourth, fifth and sixth resin layer, are subsequently applied to the second resin layer and each is dried after application.

The amount of the third resin layer applied to the top surface of the wood-based panel can be between 10-50 g/m$^2$, preferably 20-30 g/m$^2$, more preferably 25 g/m$^2$.

As explained above, the third resin layer contains glass beads that act as spacers. The glass beads preferably used have a diameter of 90-150 μm. The glass beads can be applied together with the third resin layer or sprinkled separately on the third resin layer. The amount of glass beads is 10 to 50 g/m$^2$, preferably 10 to 30 g/m$^2$, more preferably 15 to 25 g/m$^2$. The batch preferably consists of about 40 kg of resin liquid plus glass beads and auxiliaries. The glass beads can also be in silanized form. Silanization of the glass beads improves their embedding in the resin matrix.

The amount of the fourth resin layer (which also contains glass beads) applied to the top surface of the wood-based panel can be between 10-40 g/m$^2$, preferably 15-30 g/m$^2$, more preferably 20 g/m$^2$.

As explained above, the solids content of the fourth resin layer (as well as the fifth and sixth resin layers) is lower compared to the first to third resin layers. The varying solids content of the resin layers to be applied enables, on the one hand, a higher overall layer thickness due to the increased solids content in the first to third layer, and, on the other hand, the reduced solids content in the fourth to sixth resin layer ensures that the drying and pressing time is sufficient for the overall build-up.

The amount of the fifth resin layer applied to the top surface of the wood-based panel can be between 10-40 g/m$^2$, preferably 15-30 g/m$^2$. As stated above, the fifth resin layer also contains glass beads. The glass beads can be applied together with the third resin layer or sprinkled separately onto the third resin layer.

The sixth resin layer to be applied to the fifth resin layer after drying, on the other hand, does not contain any glass beads. The omission of glass beads in the sixth resin layer ensures that the underlying resin layers, which have already dried, are not destroyed and that the surface of the resin structure does not appear torn.

The total layer thickness of the applied resin layers on the wood-based panel can be between 60 and 200 μm, preferably between 90 and 150 μm, in particular preferably between 100 and 120 μm. The total layer thickness is thus significantly higher than previous processes, which typically achieve layer thicknesses of up to 50 μm.

In another embodiment, one resin layer is applied to the bottom surface of each wood-based panel along with the second, third, fourth, fifth and sixth resin layers to be applied to the top surface of the wood-based panel.

Thus, in one embodiment, a resin layer is also applied to the underside of the wood-based panel parallel to the second resin layer on the upper side of the wood-based panel. The amount of the resin layer applied to the bottom side of the wood-based panel may be between 50-100 g/m$^2$, preferably 60-80 g/m$^2$, more preferably 60 g/m$^2$. Preferably, the bottom resin layer is colored (e.g., brownish) to simulate a counter-draft. Preferably, the second resin layer is applied in parallel or simultaneously to the upper side and lower side of the wood-based panel in at least one double application unit (roller application unit). After application of the second resin layer, drying (air drying) of the assembly of first and second resin layers takes place in a first drying device.

In the same way, a third, fourth, fifth and sixth resin layer are applied to the underside parallel to the upper side in double application units on the carrier plate and dried in each case following application.

The resin layer(s) applied to the underside act as a counter-tension. Applying the resin layers to the top and bottom sides of the wood-based panels in approximately equal amounts ensures that the tensile forces on the wood-based panel created by the applied layers during pressing cancel each other out. The countercoat applied to the underside corresponds in its layer structure and the respective layer thickness approximately to the layer sequence applied to the top side, but without the addition of glass beads.

The resin layers are dried at dryer temperatures between 150 and 220° C., preferably between 180 and 210° C., in particular in a convection dryer. The temperature is adapted to the respective resin layers and can vary in the individual convection dryers; for example, the temperature in the second, third and fourth convection dryers can be 205° C., and in the fifth and sixth convection dryers it can be 198° C. in each case. However, other dryers can be used instead of convection dryers.

In the pressing step following the final drying step, the layer structure is pressed under the influence of pressure and temperature in a short-cycle press at temperatures between 150 and 250° C., preferably between 180 and 230° C., more preferably at 200° C., and at a pressure between 30 and 60 kg/cm$^2$, more preferably between 40 and 50 kg/cm$^2$. The pressing time is between 5 to 15 sec, preferably between 7 to 10 sec. In comparison: for decorative papers, a pressure of 50-60 kg/cm$^2$ is applied for 16 sec.

Preferably, the coated wood-based panel is aligned in the short-cycle press with respect to a structured press plate located in the short-cycle press by means of markings on the wood-based panel, so that congruence is produced between the decor on the wood-based panel and the structure of the press plate to be imprinted. This makes it possible to produce a decor-synchronous structure. During pressing, the melamine resin layers melt and a laminate is formed by a condensation reaction involving the corundum/glass/fiber components.

In another embodiment, the at least one wood-based panel is a medium-density fiber (MDF), high-density fiber (HDF), or particleboard or oriented strand board (OSB) or plywood panel and/or a wood-plastic panel.

In one embodiment, an unsanded wood fiberboard, in particular MDF or HDF, is used, which is still provided with a press skin (rotting layer) on the upper side. Water-based melamine resin is applied to the top surface to fill the press skin. The melamine resin is later melted in the short-cycle press and thus has a tempering effect in the area of this layer; i.e. it counteracts delamination.

The decorative layer already mentioned above can be applied by means of direct printing. In the case of direct printing, the application of a water-based pigmented printing ink is carried out by gravure or digital printing, whereby the water-based pigmented printing ink can be applied in more than one layer, e.g. in the form of two to ten layers, preferably three to eight layers.

In the case of direct printing, the application of the at least one decorative layer is carried out as mentioned by means of an analog gravure printing process and/or a digital printing process. The gravure printing process is a printing technique in which the elements to be imaged are present as depressions in a printing forme which is inked before printing. The printing ink is located primarily in the depressions and is transferred to the object to be printed, such as a wood fiber carrier board, due to the contact pressure of the printing forme and adhesion forces. In contrast, digital printing transfers the printed image directly from a computer to a printing press, such as a laser printer or inkjet printer. This eliminates the use of a static printing plate. In both processes, the use of aqueous inks or UV-based colorants is possible. It is also conceivable to combine the above-mentioned printing techniques from gravure and digital printing. A suitable combination of printing techniques can be carried out either directly on the substrate or the layer to be printed, or before printing by adapting the electronic data sets used.

Together with the decor, the markings required for alignment in the press are also printed.

It is also possible for at least one primer layer to be arranged between the wood-based panel or carrier board and the at least one decorative layer. The primer layer is applied before printing.

The primer layer preferably used comprises a composition of casein or soy protein as binder and inorganic pigments, in particular inorganic color pigments. White pigments such as titanium dioxide can be used as color pigments in the primer layer, or other color pigments such as calcium carbonate, barium sulfate or barium carbonate. In addition to the color pigments and the casein or soy protein, the primer may also contain water as a solvent. It is also preferred if the applied pigmented base coat consists of at least one, preferably at least two, in particular preferably at least four successively applied layers or coatings, wherein the application quantity between the layers or coatings can be the same or different.

The present method thus enables the production of an abrasion-resistant wood-based panel provided with a decorative layer and having a resin structure comprising abrasion-resistant particles. The wood-based panel comprises at least one decorative layer on the upper side and a multilayer resin structure containing abrasion-resistant particles, cellulose fibers and glass beads, the multilayer resin structure having a total layer thickness of between 60 and 200 μm, preferably between 90 and 150 μm, in particular preferably between 100 and 120 μm.

The wood-based panel provided with a decorative layer comprises a resin structure consisting of first and second resin layers each containing abrasion-resistant particles on the upper side, a corresponding resin layer on the lower side, at least one third resin layer on the upper side and a corresponding resin layer on the lower side of the wood-based panel, at least a fourth, fifth and sixth resin layer on the upper side and respective corresponding resin layers on the lower side of the wood-based panel, wherein glass beads may be contained in the third to fifth resin layers provided on the upper side of the wood-based panel.

In a preferred embodiment, the present process enables the production of an abrasion-resistant wood-based panel with the following layer structure (viewed from bottom to top): Backing layer of six resin layers-wood-based panel-primer layer-print decoration layer-protective layer, in particular a protective layer of a not yet fully cured resin-first resin layer with cellulose fibers-layer of abrasion-resistant particles-second resin layer-third resin layer with glass beads-fourth resin layer with glass beads-fifth resin layer with glass beads-sixth resin layer (without glass beads).

The protective layer serves to cover the decor and protect it during intermediate storage (stacking, storage, transport). The other resin layers on the top side together form an overlay that protects the finished laminate against abrasion and enables decor-synchronous structuring.

The production line for carrying out the present method includes the following elements:

- at least one first applicator for applying a first resin layer, which may include fibers, to the top surface of the wood-based panel;
- at least one device arranged downstream of the first applicator in the processing direction for scattering a predetermined amount of abrasion-resistant particles;
- at least one second application device arranged downstream of the first application device and scattering device in the processing direction for applying a second resin layer to the upper side of the wood-based panel,
- at least one drying device arranged downstream of the second application device in the processing direction for drying the layer structure comprising the first and second resin layers;
- at least one third application device arranged downstream of the drying device in the processing direction for applying a resin layer containing third glass beads to the upper surface and/or a resin layer in parallel to the lower surface of the support plate,
- at least one further drying device arranged downstream of the third application device in the processing direction for drying the third upper and/or corresponding lower resin layer;
- at least one fourth application device arranged downstream of the further drying device in the processing direction for applying a resin layer containing fourth glass beads to the upper side, and/or a resin layer in parallel to the lower side of the carrier plate (without glass beads),
- at least one drying device arranged downstream of the fourth application device in the processing direction for drying the fourth upper and/or corresponding lower resin layer;
- at least one fifth application device arranged downstream of the drying device in the processing direction for applying a fifth resin layer containing glass beads to the upper side and/or a resin layer in parallel to the lower side of the carrier plate (without glass beads);
- at least one drying device arranged downstream of the fifth application device in the processing direction for drying the fifth upper and/or corresponding lower resin layer;
- at least one sixth application device arranged downstream of the drying device in the processing direction for applying a sixth resin layer to the upper side and/or a resin layer in parallel to the lower side of the carrier plate;
- at least one drying device arranged downstream of the sixth applicator for drying the sixth upper and/or corresponding lower resin layer; and
- at least one short-cycle press arranged downstream of the last drying device in the processing direction.

In a variant of the present production line, no drying device is provided upstream of the first application device, or in case a drying device is installed as part of the production line, this drying device is not in operation, i.e. not active.

Also, no drying device is provided between the scattering device and the second application device. Rather, after leaving the scattering device, the still damp plate is fed directly into the second application device.

In one embodiment, the present production line comprises, as a whole, a single, single-sided application unit for applying the first resin layer to the upper side of the printed wood-based panel and five double application units for applying five further resin layers to the upper side and lower side of the wood-based panel, at least one drying device for drying the upper and/or lower resin layer being provided downstream of each double application unit.

The scattering device for the abrasion-resistant particles provided in the present production line is suitable for scattering powder, granules, fibers and comprises an oscillating brush system. The scattering device consists essentially of a supply hopper, a rotating, structured roller and a scraper. Here, the rotational speed of the roller is used to determine the amount of abrasion-resistant material applied. The scattering device preferably comprises a spiked roller.

In one embodiment of the present production line, it is further provided that the at least one scattering device is surrounded by or arranged in at least one booth, which is provided with at least one means for removing dusts occurring in the booth. The means for removing the dusts may be in the form of a suction device or may be in the form of a device for blowing in air. The blowing in of air can be achieved via nozzles installed at the plate inlet and outlet, which blow air into the booth. In addition, these can prevent air movements from creating an inhomogeneous scatter curtain of abrasion-resistant material.

The removal of dust from abrasion-resistant material from the environment of the scattering device is advantageous, because apart from the health burden for the workers working on the production line, the fine dust from abrasion-resistant particles is also deposited on other equipment parts of the production line and leads to increased wear of the same. Therefore, the arrangement of the scattering device in a cabin serves not only to reduce the health impact of dust on the environment of the production line, but also prevents premature wear.

The scattering device is preferably controlled by a light barrier, whereby the light barrier is arranged in the processing direction in front of the roller (scattering roller) provided below the scattering device. The control of the scattering device by means of a light barrier is useful if there are more or less large gaps between the individual wood-based panels, as this starts the scattering process as soon as a panel is located in front of the scattering roller.

In one embodiment of the present scattering device, at least one hopper is provided in front of the scattering roller for collecting excess abrasion-resistant particles (i.e., abrasion-resistant particles not scattered on the at least one wood-based panel, but rather falling down in front of the wood-based panel before the latter is moved in by means of the transport device under the scattering roller).

In a more advanced embodiment, the hopper is coupled to at least one conveyor and a screening device, wherein the excess abrasion-resistant material collected in the hopper is transported to the screening device via the conveyor. The screen meshes of the screening device correspond to the largest used grain of the abrasion resistant particulate material (i.e., approximately 80-100 μm). In the screening device, dirt particles and clumped material (such as clumped resin or clumped abrasion resistant material) are separated from the collected abrasion resistant material and the screened abrasion resistant material can be returned (recycled) to the scattering device.

As already explained above, it is also intended to add the hardener to the liquid resin in a targeted manner at the corresponding application units or application devices for the various resin layers. In one embodiment of the present production line, at least one metering unit for the addition of the hardener at each application device is provided for this purpose. The hardener is pumped from the at least one metering unit into the feed tank for the resin and mixed with the resin in the feed tank, e.g. by means of a suitable agitator.

BRIEF DESCRIPTION OF THE DRAWING

The solution is explained in more detail below with reference to the FIGURES in the drawings, using an example of an embodiment.

FIG. 1 shows a schematic representation of a production line of a wood-based panel using the method according to the proposed solution.

DETAILED DESCRIPTION OF THE INVENTION

The production line shown schematically in FIG. 1 includes an IR dryer 1*a* which is switched off. Removal of the IR dryer 1*a* from the production line avoids the electrostatic charging of the plate surface that would otherwise take place in the IR dryer, which makes it possible to form a homogeneous scattering curtain of corundum.

The production line further comprises a single-sided applicator unit 1 (grooved roller), and five double applicator units 2, 3, 4, 5, 6 for simultaneous application of the respective resin layer to the upper side and the lower side of the separated printed material boards, e.g. of printed HDF boards, as well as four convection dryers 2*a*, 3*a*, 4*a*, 5*a*, 6*a* arranged behind each of the applicator units in the processing direction.

Downstream of the first applicator roll 1, a first scattering device 20 is provided for uniformly scattering the abrasion-resistant material such as corundum onto the first resin layer on the top side of the HDF board. The abrasion resistant material used is F200 corundum, which measures about 53-75 μm in diameter according to FEPA standards. The scattering device 20 essentially consists of a supply hopper, a rotating, structured spiked roller and a scraper. The application rate of the material is determined by the rotational speed of the scattering roller. Depending on the required abrasion class of the product, between 12-25 g/m$^2$ of corundum is scattered onto the resin-coated board (AC4 (according to EN 13329)=20 g/m$^2$). From the spiked roller, the corundum falls onto the melamine resin treated board at a distance of 5 cm. Since the first resin layer is still liquid at the time of scattering, the abrasion-resistant particles can sink into the resin layer. Under the present scattering device, at least one hopper (not shown) is provided in front of the scattering roller for collecting excess abrasion-resistant particles (i.e., abrasion-resistant particles not scattered on the at least one wood-based panel, but rather falling down in front of the wood-based panel before the wood-based panel is moved in by means of the transport device under the scattering roller).

In the double-sided coating unit 2, the board coated with melamine-formaldehyde resin and corundum is coated with further melamine-formaldehyde resin (about 20 g/m$^2$). At the same time, the unattached corundum is removed in small amounts and accumulates in the melamine resin liquor until saturation (about 10 wt. %) occurs. This lost portion of the corundum is now continuously reapplied to the board by the roller application of coating unit 1-1. The second application covers the corundum grains with liquid resin or incorporates them into the overlay layer. This prevents the corundum from being removed in the convection dryer due to the high air turbulence.

The build-up of first and second resin layers is dried in convection dryer 2*a*.

Downstream of the third double coater 3 for applying the third resin layer, there may be another scattering device 20 for applying glass beads to the third resin layer followed by a third convection dryer 3*a* for drying the third resin layer. The scattering device 20 for the glass beads is optional. The glass beads may also be applied together with the third resin layer.

After application of the fourth to sixth resin layers in a fourth to sixth double coater 4, 5, 6 and drying in a convection dryer 4*a*, 5*a*, 6*a* respectively, the layer structure is cured in a short-cycle press 7 at a pressing temperature of 180-220° C. and a pressing time of 8 to 10 seconds under a specific pressure of 40 kg/cm$^2$. The pressed sheets are cooled and stored.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A wood-based panel with at least one decorative layer arranged on an upper side with the following layer structure, viewed from bottom to top:

a backing layer of six layers of resin;
a wood-based panel;
a primer layer;
a print decoration layer;
a protective layer;
a first resin layer with cellulose fibres;
a layer of abrasion-resistant particles;
a second resin layer;
a third resin layer with glass beads;
a fourth resin layer with glass beads;
a fifth resin layer with glass beads; and
a sixth resin layer without glass beads,
wherein a total thickness of the first, second, third, fourth, fifth, and sixth resin layers is between 120 and 200 μm,
wherein an amount of glass beads in each of the third, fourth, and fifth resin layers is 10 to 50 g/m$^2$, and
wherein an amount of abrasion-resistant particles is 10 to 50 g/m$^2$.

2. The wood-based panel according to claim 1 with markings in the decorative layer for aligning the wood-based panel in a press.

3. The wood-based panel according to claim 1, wherein the resin layers are based on aqueous formaldehyde-containing resins.

4. The wood-based panel according to claim 1, wherein the first, second, and third resin layers each have a solids content of between 60 and 80% by weight.

5. The wood-based panel according to claim 1, wherein the fourth, fifth and sixth resin layers each have a solids content of between 50 and 70% by weight.

6. The wood-based panel according to claim 1, wherein the abrasion- resistant particles are corundum particles.

7. The wood-based panel according to claim 1, wherein the glass beads have a diameter of 90 to 150 μm.

8. The wood-based panel according to claim 1, with an abrasion value in abrasion classes AC4 to AC6.

9. The wood-based panel according to claim 1, wherein an amount of cellulose fibres in the first resin layer is between 0.1 and 1 wt %.

10. The wood-based panel according to claim 1, wherein the wood-based panel is a medium-density fibre (MDF), high-density fibre (HDF) or chipboard, oriented strand board (OSB) a plywood panel, and/or a wood-plastic panel.

11. A production line for manufacturing a wood-based panel according to claim 1 comprising the following elements:

a first application device for applying the first resin layer containing cellulose fibres, to the upper side of the wood-based panel;

at least one device arranged downstream of the first application device in a processing direction for scattering a predetermined amount of abrasion-resistant particles;

a second application device arranged behind the first application device and scattering device in the processing direction for applying the second resin layer to the upper side of the wood-based panel;

at least one first drying device arranged behind the second application device in the processing direction for drying a layer structure of the first and second resin layers;

a third application device arranged downstream of the at least one first drying device in the processing direction for applying the third resin layer containing glass beads to the upper side and, optionally, a resin layer in parallel to a lower side of the wood-based panel;

at least one second drying device arranged behind the third application device in the processing direction for drying the upper third and the corresponding optional lower resin layer, if present;

a fourth application device arranged downstream of the at least one second drying device in the processing direction for applying the fourth resin layer containing glass beads to the upper side and, optionally, a resin layer without glass beads in parallel to the lower side of the wood-based panel;

at least one third drying device arranged behind the fourth application device in the processing direction for drying the upper fourth resin layer and the corresponding lower resin layer, if present;

a fifth application device arranged downstream of the at least one third drying device in the processing direction for applying the fifth resin layer with glass beads to the upper side, and optionally, a resin layer without glass beads in parallel to the lower side of the wood-based panel;

at least one fourth drying device arranged downstream of the fifth application device for drying the upper fifth resin layer and the corresponding lower resin layer, if present;

a sixth application device arranged downstream of the at least one fourth drying device in the processing direction for applying the sixth resin layer without glass beads to the upper side, and, optionally, a resin layer in parallel to the lower side of the wood-based panel;

at least one fifth drying device arranged downstream of the sixth application device in the processing direction for drying the upper sixth resin layer and the corresponding lower resin layer, if present; and at least one short-cycle press arranged downstream of the last drying device in the processing direction.

12. The wood-based panel according to claim 3, wherein the resin layers are melamine-formaldehyde resin, urea-formaldehyde resin or melamine-urea-formaldehyde resin.

13. The wood-based panel according to claim 1, wherein the first, second and third resin layers each have a solids content of between 65 and 70% by weight.

14. The wood-based panel according to claim 1, wherein the fourth, fifth and sixth resin layers each have a solids content of 55 and 65% by weight.

15. The wood-based panel according to claim 1, wherein a total thickness of the first, second, third, fourth, fifth, and sixth resin layers is between 150 and 200 μm.

16. The wood-based panel according to claim 1, wherein the amount of abrasion-resistant particles is 10 to 30 $g/m^2$.

17. The wood-based panel according to claim 1, wherein an amount of glass beads in each of the third, fourth, and fifth resin layers is 10 to 30 $g/m^2$.

* * * * *